United States Patent Office 2,840,652
Patented June 24, 1958

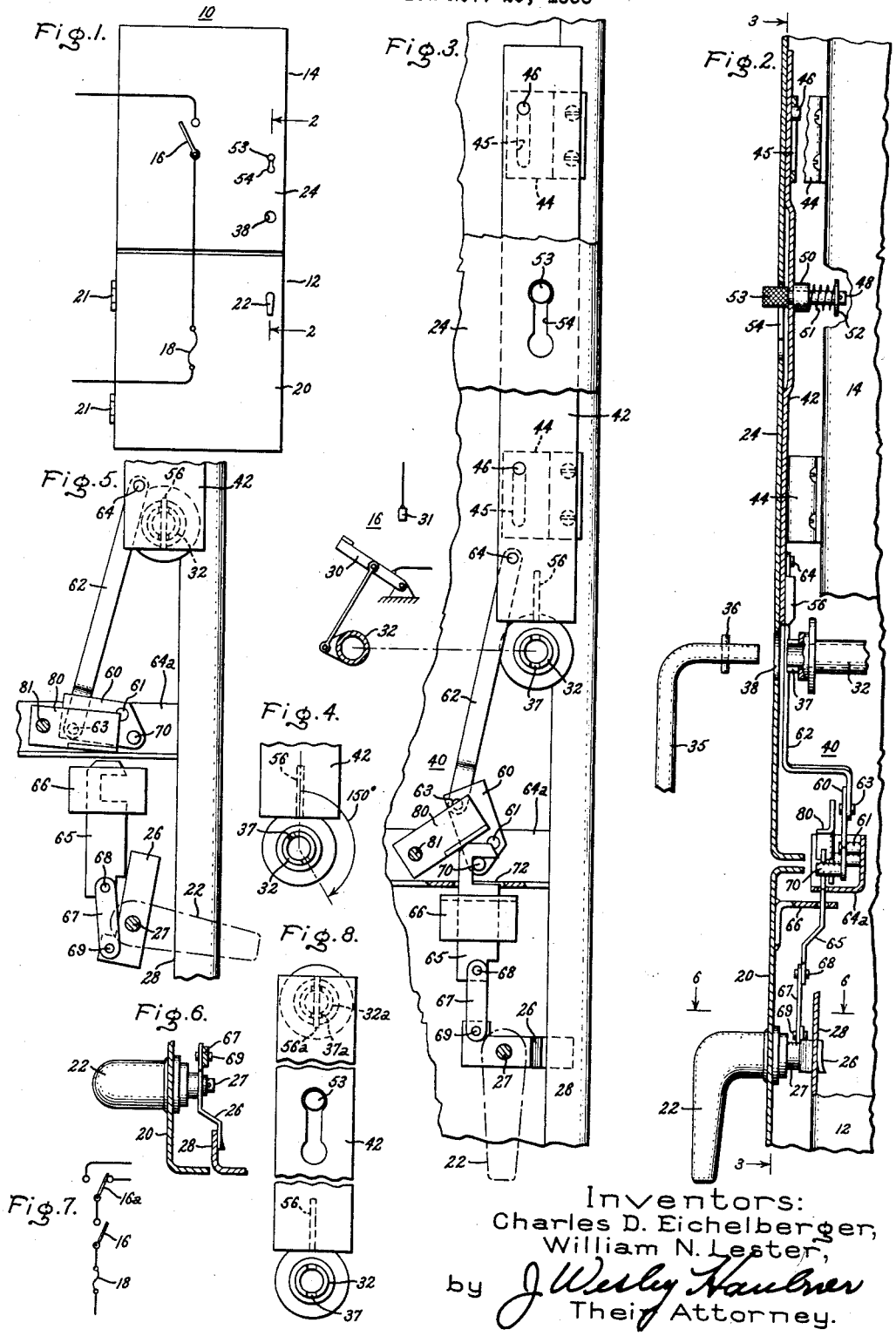

2,840,652

INTERLOCK FOR ELECTRIC SWITCHGEAR

Charles D. Eichelberger, Ridley Park, and William N. Lester, Norwood, Pa., assignors to General Electric Company, a corporation of New York Application November 29, 1956, Serial No. 625,142

10 Claims. (Cl. 200—50)

This invention relates to an interlocking scheme for electric switchgear and, more particularly, to an interlocking scheme for switchgear of the type comprising a switch and another electrical device electrically connected in series and enclosed in separate compartments.

In such switchgear units, it is highly desirable, for safety reasons, that the switch be in open position at all times when access may be had to the series-connected electrical device. In this regard, the door which affords access to the electrical device should be prevented from opening unless the switch is open, and the switch should remain open so long as the door is open.

Prior interlocks which have been relied upon for these purposes have usually been of the well-known key type. Such interlocks have been unduly expensive, and efforts to provide cheaper interlocks have not been entirely successful. For example, one of the most common deficiencies of these latter interlocks is that generally they can be defeated relatively easily when the access door is open, inasmuch as the switch-disabling components of the interlock are exposed for accidental actuation. Another disadvantage of most of these prior arrangements is that they have allowed the access door to be unlatched and slightly opened before the interlock becomes fully operative. As a result, there is the possibility of the switch being closed when the access door is slightly opened. This is undesirable because of the increased possibilities of access being had to the energized electrical device and because of the possibility of the door being blown completely open in response to a short circuit.

Accordingly, an object of our invention is to provide, for switchgear units of the above type, a new and improved interlock which insures that the switch will be in open position at all times when access may be had to the series-connected electrical device.

Another object is to provide an interlock of the above type which is very difficult to defeat unintentionally even when the door of the electrical device has been opened.

Another object is provide an interlock which is so related to the access door of an enclosed electrical device that the interlock acts to carry out its desired safety function whenever the door is unlatched and also whenever the door is open to any extent irrespective of the position of the door latch.

For a better understanding of our invention, reference may be had to the following specification taken in connection with the accompanying drawings, wherein:

Fig. 1 is a front elevational view, partially schematic, illustrating a switchgear unit embodying one form of our invention.

Fig. 2 is a sectional view taken along the line 2—2 of Fig. 1.

Fig. 3 is a sectional view taken along the line 3—3 of Fig. 2.

Fig. 4 is a fragmentary view of a portion of the apparatus shown in Fig. 3, but with the parts thereof being shown in a different position.

Fig. 5 is a view similar to that of Fig. 3 but with the parts of the apparatus shown in another different position.

Fig. 6 is a sectional view taken along the line 6—6 of Fig. 2.

Fig. 7 is a schematic diagram of a modified form of apparatus to which our invention is applicable.

Fig. 8 shows in greater detail one manner for applying our inventions to the apparatus of Fig. 7.

Referring now to Fig. 1, the switchgear unit 10 shown therein comprises a lower metallic compartment 12 and an upper metallic compartment 14 mounted atop the lower compartment. The upper compartment contains an electric switch diagrammatically illustrated at 16, and the lower compartment contains an electrical device such as a fuse diagrammatically illustrated at 18 and connected in series-circuit relationship with the switch. The lower compartment is provided with a door 20 which may be opened to allow for ready access to the fuse or other device contained therein so as to permit inspection or replacement of the device or other needed repair work. The door 20 is preferably pivotally mounted on one side upon hinges 21 and is provided with a handle 22 for controlling a suitable door latch, which will soon be described. The upper compartment, on the other hand, is provided with a front cover 24 which is preferably bolted in place to prevent ready access to the switch 16 contained therein.

The door latch, which is located at a side of the door opposite to its hinged side, is best illustrated in Figs. 2 and 6, where it is shown at 26 pivotally-mounted on the door 20 by means of a rotatable shaft 27 to which the handle 22 is secured. When the latch 26 is in its latched position and the door 20 is closed, the outer end of the latch fits behind a lip 28 which projects from the sidewall of the compartment 12 and thereby locks the door closed. When the handle 22 is pivoted to move the latch 26 into an unlatched position, the door 20 is free to open.

Referring to the diagrammatic showing of Fig. 3, the switch 16 is of a conventional construction and comprises a pivotally-mounted switch blade 30 which is movable into and out of engagement with a stationary contact 31. Operation of the blade 30 is produced by the action of a rotatably-mounted shaft 32 suitably coupled to the blade. In Fig. 3 the blade 30 and the operating shaft 32 are shown in their respective switch-open positions. When the shaft is rotated through approximately 150 degrees in a clockwise direction, it acts to drive the blade 30 into circuit-closing engagement with the stationary contact 31. The position of the operating shaft at the completion of such switch-closing action is shown in Fig. 4. To open the switch, the shaft may be rotated in a reverse or counterclockwise direction from its position of Fig. 4 to its position of Fig. 3.

For rotating the shaft 32 in either direction so as to produce the above-described switch operations, there is provided a crank 35 (Fig. 2) which carries a radially projecting pin 36 at its inner end. When the inner end of the crank 35 is inserted into the tubular outer end of the operating shaft 32, the pin 36 fits into a pair of diametrically-opposed notches 37 formed in the shaft. This provides between the crank 35 and the shaft 32 a coupling through which switch-operating forces may be transmitted from the crank. An opening 38 is provided in the cover 24, and when unblocked, this opening allows the crank 35 to be inserted through the cover 24 and into torque-transmitting relationship with the operating shaft 32.

For safety reasons, it is highly desirable that the switch 16 in the upper compartment be open before the door 20 can be opened to allow access to the interior of the lower compartment. It is also highly desirable once the door 20 has been opened (after opening of the switch)

that the switch be maintained in open position so long as the door is open.

For carrying out these desired safety functions, an interlocking arrangement 40 is provided. This interlocking arrangement comprises a shutter 42 which is slidably mounted on the upper compartment 14 closely adjacent the front cover 24. For providing this slidable mounting, a pair of vertically-spaced Z-shaped brackets 44 are attached to the compartment 14. These Z-shaped brackets contain vertically-extending slots 45 which slidably receive guide pins 46 fixed to the shutter 42. These guide pins 46 coact with the slots 45 to guide the shutter 42 in a vertically-extending path.

The shutter has a lower position in which it acts to obstruct switch-operation by covering the opening 38 so as to block access to the switch-operating shaft 32. This access-blocking position is shown in Fig. 5. To allow for access to the operating shaft, the shutter 42 must first be shifted upwardly out of its access-blocking position of Fig. 5. Figs. 2 and 3 show the shutter in such upper position after having been displaced from the lower or access-blocking position.

To provide for vertical shifting of the shutter 42, a rod 48 carried by the shutter 42 and projecting through the cover 24 is provided. Referring to Fig. 2, this rod 48 is slidably supported for movement along its own axis by means of a bushing 50 fixed to the shutter and is biased into the retracted position shown in Fig. 2 by means of a suitable compression spring 51, which is disposed between the bushing 50 and a washer 52 suitably fixed to the rod 48. The rod 48 has an enlarged head 53 which is adapted to coact with a keyhole slot 54 formed in the cover 24 to provide for locking the shutter either in its upper or lower position. For example, referring to Fig. 2, when the rod 48 is slid to the left, the enlarged head 53 moves out of the slot 54, and the operator is then free to lower the shutter 42. The restricted portion of the rod 48 slides in the slot 54 during such lowering. When the shutter reaches its lowermost position, the operator may release the rod 48, whereupon the spring 51 will retract the enlarged head 53 into locking engagement with the enlarged lower portion of the keyhole slot 54. The shutter 42 may be raised in a corresponding manner, and when in its uppermost position, as shown in Fig. 2, it is locked against vertical movement by the retracted head 53 engaging the enlarged upper portion of the slot 54.

For reasons which will soon become apparent, the shutter 42 is prevented from moving into its lower or access-blocking position unless the switch 16 is in open position. If the switch is closed, downward movement of the shutter 42 is blocked by interference means in the form of the outer end of the operating shaft 32 and a key 56 fixed to the shutter 42. For example, assume that an operator attempts to lower the shutter 42 when the switch is in its closed position, illustrated in Fig. 4. Since the slot 37, which is formed in the outer end of operating shaft 32, is then out of alignment with the key 56, the shaft 32 will interfere with the key 56 and, thus, block further downward movement of the shutter. If, on the other hand, the switch is open, as is illustrated in Figs. 2 and 3, the slot 37 will be in alignment with the key 56, and the shaft 32 will not interfere with lowering of the shutter 42. Thus, only when the switch is open, can the shutter 42 be lowered into its access-blocking position.

The key 56 serves the additional function of locking the switch 16 in open position when the shutter is lowered inasmuch as the interlocking engagement between the key 56 and the slot 37 serves to prevent rotation of the operating shaft 32 out of the switch-open position.

The interlock 40 further comprises a pair of coacting linkages which operatively interconnect the shutter 42 and the door latch 26. As shown in Figs. 2 and 3, one of these linkages is located in the upper compartment and comprises a crank 60 pivotally mounted upon a stationary pivot 61 and connected to the shutter 42 by a connecting link 62. The connecting link 62 is pivotally connected at 63 to the crank 60 and at 64 to the shutter 42. The stationary pivot 61 is mounted on an angle iron 64a extending transversely across the bottom of the upper compartment 14.

The other linkage is located in the lower compartment and comprises a hook member 65 which is slidably mounted for vertical movement upon the door 20 by means of a guide bracket 66 fixed to the door. This hook member 65 is operatively connected to the door latch 26 by means of an intermediate link 67 pivotally connected at 68 to the hook member 65 and at 69 to the latch 26. Referring to Fig. 3, when the shutter 42 is in its upper position, the crank 60 and the hook member 65 are coupled together by means of a projecting pin 70 carried by the crank 60 and positioned within the recessed portion of the hook member 65. The hook member 65, in the position of Figs. 2 and 3 is shown extending through a slot formed in the bottom wall of the angle iron 64a.

If a maintenance man desires to open the door 20 of the lower compartment when the switch is in open position as shown in Figs. 2 and 3, he must first lower the shutter 42. This shifts the linkage in the upper compartment into the position shown in Fig. 5. This results in the projecting pin 70 being moved laterally to the right out of the recessed portion of the hook member 65. The hook member is then free to move downwardly when the handle 22 is operated in a counterclockwise direction to unlatch the door. When the door is unlatched, as shown in Fig. 5, the hook member 65 is withdrawn from the upper compartment, and the door 20 can be freely opened. In view of the above described operation, the pin 70 and the upper end of the hook 65 may be thought of as constituting separable coupling means which operatively interconnects the two linkages when the door 20 is closed. The lower linkage 65, 67 acts in response to movement of the latch into its unlatched position to separate the parts of the coupling means sufficiently to allow for opening of the unlatched door.

Should the maintenance man attempt to carry out the above-described door-opening action before he has lowered the shutter 42, then the pin 70 would act to block unlatching of the door 20. In this regard, the pin 70 would block downward movement of the hook member 65 from its upper position of Fig. 3, and this, in turn, would block movement of the latch 26 into its unlatched position. The pin 70 is barred from movement during this interval due to the fact that the shutter-controlling head 53 is then locking the shutter in the upper position of Figs. 2 and 3.

Thus, since the door latch 26 cannot be moved into its unlatched position unless the shutter 42 is first lowered and since the shutter cannot be lowered until the switch 16 is open (due to the previously-described interference means 32, 37, 56), it will be apparent that the closed door cannot be unlatched until the switch 16 is first opened.

To insure that no switch-closing operations are performed during the time the door 20 is open, a locking prop 80 is provided for coaction with the linkage means interconnecting the shutter 42 and the latch 26. This locking prop 80 is pivotally mounted within the upper compartment on a stationary pivot 81 carried by the angle iron 64a. The upper end of the hook member 65 normally holds the locking prop 80 in the disabled position shown in Fig. 3. In such position, the locking prop is incapable of interfering with raising and lowering of the shutter 42 inasmuch as it is out of the path of the pin 70. When, however, the hook member 65 is withdrawn from the upper compartment in response to unlatching of the door 20, the locking prop falls into its locking position of Fig. 5 under the influence of gravity or a suitable spring (not shown). In the locking position of Fig. 5, the prop 80 will encounter the pin 70 whenever raising of the shutter 42 is attempted and will act through this pin 70 to block upward movement of the shutter. For example, when it is attempted to raise the shutter 42 from the position of Fig. 5, the pin 70 will encounter the front end of the prop 80 as the crank 60 begins to move clockwise, and, as a result, further upward movement of the shutter 42 will be blocked. The front end of the prop 80 is so shaped that during such blocking action, the pin 70 acts through a line of action which is below the axis of pivot 81, thus forcing the prop against the floor of the angle iron 64a and insuring that the prop is not incorrectly displaced from its locking position by the pin 70.

It will be apparent from the above description that the prop 80 is capable of moving from its disabled to its locking position solely in response to unlatching of the closed door and is not dependent upon any door-opening action for such movement. As a result, it is unnecessary to operatively connect the locking prop to the door, thus avoiding the need for any precise relationship between the door and the locking prop.

Since the lower linkage 65—67 is mounted on the door 20, it should also be apparent that when the door has been opened to any extent, movement of the latch 26 will have no effect on the upper linkage 60, 62 inasmuch as the lower linkage is then completely separated from the upper linkage. Thus, when the door has been opened to any extent, the latch 26 can be freely moved without affecting the shutter 42 or the locking means 70, 80, 81, which is then locking the shutter 42 in its access-blocking position.

To enable the shutter 42 to be lifted so as to allow the operating shaft 32 to be utilized for a switch-closing operation, it is first necessary to close the door 20 and then to latch the door in closed position. Only when the door is so latched, is the locking prop 80 disabled and prevented from interfering with raising of the shutter 42. The door must be completely closed before the hook member aligns with the slot 72 in the channel 64a, thus insuring that operation of the latch prior to the door's being completely closed will not affect the locking prop 80.

A factor which renders our interlock most difficult to defeat is the fact that the lower linkage 65—67 is mounted on the door 20 and, therefore, bodily separates from the upper linkage 60, 62 when the door is opened. As a result, when the door 20 is open, the hook member 65 is no longer available to disable the locking prop 80. Since the locking prop 80 is concealed behind the upper cover 24 and is most inaccessible, it is extremely unlikely that the prop will be accidentally displaced from its locking position of Fig. 5.

Another advantage of our illustrated interlock is that an attempted switch-closing operation during the time that the interlock is maintaining the switch open will not result in the interlock being subjected to any undue mechanical stresses. During such time, the shutter-actuating head 53 is the only part of the switch accessible for operation, and it is virtually impossible to apply damaging stresses to the interlock linkage by forces applied through this small head 53. There is no danger that forces will be applied to the interlocking linkage through a force-multiplying switch-actuating arm, as has been the case in some prior interlocks.

It should be apparent that our door latch 26 may be locked in closed position by a suitable key lock (not shown) provided in the handle 22, and this will not interfere with the desired switch operation since the linkage 62, 60, 65, 67 permits the shutter to be moved independently of the latch 26, as described hereinabove. It is therefore unnecessary to provide separately-operable key-controlled and interlock-controlled latches, as has been the case in some prior interlocks.

Another advantage of our interlocking scheme is that it can be easily modified to interlock additional switches to the access door 20 and the switch 16. For example, referring to Fig. 7, assume that a second switch 16a is to be utilized for connecting the switch 16 to either one or the other of a pair of power sources and that it is desired that the switch 16a should not be operated unless the switch 16 is in open position. Referring to Fig. 8 the switch 16a has an operating shaft 32a which is accessible only when the shutter 42 is lowered. Since the shutter 42 cannot be lowered until the switch 16 is in open position, as explained hereinabove, it will be apparent that the switch 16a cannot be operated until the switch 16 is open, as is desired. A key 56a carried by the shutter 42 at its upper end coacts with a slot 37a in the operating shaft 32a to insure that the switch 16a is in a predetermined position before the switch 16 is rendered closable by lifting of the shutter 42. Once the shutter 42 has been lifted, the key 56a coacts with the slot 37a to lock the additional switch in the desired predetermined position.

While we have shown and described particular embodiments of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. In a switchgear unit, a first compartment containing a switch which includes switch-controlling means operable to produce opening and closing of said switch, a second compartment mounted adjacent said first compartment and containing an electrical device connected in series with said switch, said second compartment having an access door which is hinged at one side and is openable to afford access to said electrical device, a latch movably mounted on said door at a side opposite from said one side, said latch being operable in a latched position to lock said door closed and being movable into an unlatched position while said door is closed thereafter to permit opening of said door, linkage means operably interconnecting said switch-controlling means and said latch when the door is closed for insuring that said switch is open when said latch is moved to unlatched position while the door is closed, locking means operable in response to movement of said latch into said unlatched position while said door is closed for blocking switch-closing operation of said switch-controlling means so long as the latch of the closed door is in unlatched position, means for disabling said locking means in response to movement of said latch of the closed door into latched position, and means permitting said switch-controlling means to be operated independently of said latch while said latch of the closed door is in latched position.

2. In a switchgear unit, a first compartment containing a switch which includes switch-controlling means operable to produce opening and closing of said switch, a second compartment mounted adjacent said first compartment and containing an electrical device connected in series with said switch, said second compartment having an access door which is openable to afford access to said electrical device, a latch operable in a latched position to lock said door closed and operable in an unlatched position to permit opening of said door, linkage means operably interconnecting said switch-controlling means and said latch when the door is closed for insuring that said switch is open when said latch is moved to unlatched position while the door is closed, locking means operable in response to movement of said latch into said unlatched position while said door is closed for blocking switch-closing operation of said switch-controlling means so long as the latch of the closed door is in unlatched position, a second switch having switch-controlling means operable to produce a change in the operative position of said second switch, said linkage means having a predetermined position in which it is effective to block operation of the switch-controlling means of said second switch but to allow operation of the switch-controlling means for said first switch, and interference means sensitive to the operative position of said second switch and coacting with said linkage means for barring movement of said linkage means into said predetermined position so long as said second switch is out of a predetermined operative position.

3. In a switchgear unit, a first compartment containing a switch which includes switch-controlling means operable to produce opening and closing of said switch, a second compartment mounted adjacent said first compartment and containing an electrical device connected in series with said switch, said second compartment having an access door which is hinged at one side and is openable to afford access to said electrical device, a latch movably mounted on said door at a side opposite said one side, said latch being operable in a latched position to lock said door closed and being movable into an unlatched position while said door is closed thereafter to permit opening of said door, linkage means operably interconnecting said switch controlling means and said latch when the door is closed for insuring that said switch is open when said latch is moved to unlatched position while the door is closed, a locking member operable in a locking position to block switch-closing operation of said switch-controlling means, means for moving said locking member from a disabled position into said locking position in response to movement of said latch into said unlatched position while said door is closed, whereby to block switch-closing so long as the latch of the closed door is in unlatched position, means for returning said locking member to said disabled position in response to movement of said latch into latched position while said door is closed, and means permitting said switch-controlling means to be operated independently of said latch while said latch of the closed door is in latched position.

4. In a switchgear unit, a first compartment containing a switch which includes switch-control means for producing opening and closing of said switch, operation-obstructing means having a blocking position for blocking operation of said switch control means and allowing operation of said switch control means only when moved out of said blocking position, a second compartment mounted adjacent said first compartment and containing an electrical device which is connected in series-circuit relationship with said switch, and second compartment having an access door which is hinged at one side and is openable to allow access to said electrical device, a latch movably mounted on said door at a side opposite said one side, said latch being operable in a latched position to lock said door closed and being movable into an unlatched position while said door is closed thereafter to permit opening of said door, linkage means operably interconnecting said operation-obstructing means and said latch when said door is closed for barring movement of said latch to its unlatched position when said operation-obstructing means is displaced from its blocking position, interference means sensitive to the operative position of said switch for barring movement of said operation-obstructing means into its blocking position when said switch is closed and allowing said operation-obstructing means to be moved into its blocking position only when said switch is open, locking means operable in response to movement of said latch into its unlatched position while said door is closed for locking said operation-obstructing means in its blocking position.

5. In a switchgear unit, a first compartment containing a switch which includes switch-control means for producing opening and closing of said switch, operation-obstructing means having a blocking position for blocking operation of said switch control means and allowing operation of said switch control means only when moved out of said blocking position, a second compartment mounted adjacent said first compartment and containing an electrical device which is connected in series-circuit relationship with said switch, said second compartment having an access door which is openable to allow access to said electrical device, a latch operable in a latched position to lock said door closed and movable into an unlatched position while said door is closed thereafter to permit opening of said door, a first linkage carried by said first compartment and connected to said operation-obstructing means, a second linkage carried by said door and connected to said latch, separable coupling means operable when said door is closed for operatively interconnecting said two linkages thereby operatively interconnecting said obstructing means and said latch, means acting through said two linkages to bar movement of said latch into its unlatched position when said obstructing means is displaced from its blocking position and allowing unlatching only when said obstructing means is in its blocking position, interference means sensitive to the operative position of said switch for allowing said obstructing means to be moved into said blocking position only when said switch is open, said second linkage acting in response to movement of said latch into its unlatched position to separate the parts of said coupling means sufficiently to allow for opening of said unlatched door, said second linkage separating completely from said first linkage when said door is opened.

6. The apparatus of claim 5 in combination with locking means operable in response to movement of said latch into its unlatched position while said door is closed for locking said operation-obstructing means in its blocking position.

7. In a switchgear unit, a first compartment containing a switch which includes switch-control means for producing opening and closing of said switch, shutter means having a blocking position for blocking access to said switch control means and allowing operation of said switch control means only when moved out of said blocking position, a second compartment mounted adjacent said first compartment and containing an electric device which is connected in series-circuit relationship with said switch, said second compartment having an access door which is openable to allow access to said electrical device, a latch operable in a latched position to lock said door closed and operable in an unlatched position to permit opening of said door, linkage means operably interconnecting said shutter means and said latch when said door is closed for barring movement of said latch into its unlatched position when said shutter means is displaced from its blocking position, interference means sensitive to the operative position of said switch for barring movement of said shutter means into its blocking position when said switch is closed and allowing said shutter means to be moved into its blocking position only when said switch is open, and locking means operable in response to movement of said latch into its unlatched position while said door is closed for locking said shutter means in its blocking position.

8. In a switchgear unit, a first compartment containing a switch which includes an operating member movable between switch-open and switch-closed positions to produce switch-operation, a second compartment mounted adjacent said first compartment and containing an electric device which is connected in series-circuit relationship with said switch, said second compartment having an access door which is openable to allow access to said electrical device, a latch operable in a latched position to lock said door closed and operable in an unlatched position to permit opening of said door, said first compartment having an opening which when unblocked allows access to said operating member so as to permit utilization of said operating member for switch-operation, a movable shutter having a blocking position with respect to said opening and allowing access to said operating member only when moved out of said blocking position, and linkage means operatively interconnecting said shutter and said latch when said door is closed for barring movement of said latch into its unlatched position while said shutter is displaced from said blocking position, said linkage means acting to allow movement of said latch into its unlatched position when said shutter is in its access-blocking position, and interference means sensitive to the operative position of said switch for allowing said shutter to be moved into its access-blocking position when said switch is open and blocking movement of said shutter into its access-blocking position when said switch is closed.

9. The apparatus of claim 8 in combination with locking means operable in response to movement of said latch into its unlatched position while said door is closed for locking said shutter in its access-blocking position.

10. The apparatus of claim 8 in combination with means controlled by said shutter for mechanically locking said switch in open position in response to movement of said shutter into its access-blocking position.

References Cited in the file of this patent

UNITED STATES PATENTS

| | | |
|---|---|---|
| 2,218,028 | Heim | Oct. 15, 1940 |
| 2,414,423 | Smith et al. | Jan. 14, 1947 |
| 2,595,102 | Santangelo | Apr. 29, 1952 |